United States Patent [19]

Oh et al.

[11] Patent Number: 5,417,738
[45] Date of Patent: May 23, 1995

[54] METHOD FOR RECOVERING METALS INCLUDED IN THE SLAG GENERATED FROM STEEL MAKING PROCESS

[75] Inventors: Ok-Soo Oh, 365-3 Kaebong-Dong, Kuro-ku; Won-Dae Cho; Eun-Soo Oh, all of Seoul, Rep. of Korea

[73] Assignee: Ok-Soo Oh, Seoul, Rep. of Korea

[21] Appl. No.: 173,606

[22] Filed: Dec. 22, 1993

[30] Foreign Application Priority Data

Jun. 3, 1993 [KR] Rep. of Korea ............... 9965/1993

[51] Int. Cl.$^6$ .............................................. C22B 7/04
[52] U.S. Cl. ....................................... 75/386; 75/433; 75/582
[58] Field of Search .......................... 75/386, 433, 582

[56] References Cited

FOREIGN PATENT DOCUMENTS 700492  12/1964  Canada ................................. 75/433

*Primary Examiner*—Melvyn J. Andrews
*Attorney, Agent, or Firm*—McAulay Fisher Nissen Goldberg & Kiel

[57] ABSTRACT

A method for recovering useful metal included in slag generated from steel-making process in a convertor. The method comprises the steps of atomizing the slag in water, screening the atomized slag so as to be classified by sizes, dropping the classified slag of similar sizes into a flow of blowing air to sort it into a high-weight group and a low-weight group, and transferring the high-weight group into a furnace to recovering useful metal therefrom. The useful metal can be recovered at a low cost. In addition, since the inventive method does not accompany with the pulverization, polluting factor such as noise and dust is eliminated and thus, the working conditions become more comfortable. Moreover, the inventive method is advantageous in a view of reuse because the low-weight slag is used as useful materials such as short balls, grits, fluxes and aggregates.

4 Claims, No Drawings

METHOD FOR RECOVERING METALS INCLUDED IN THE SLAG GENERATED FROM STEEL MAKING PROCESS

BACKGROUND OF THE INVENTION

1. Field of the Invention

The present invention relates in general to a method for recovering metals included in the slag generated from steelmaking process using a convertor, and more particularly to a method for selecting the slag containing high metals content from the relative light slag.

2. Description of the Prior Art

Since a considerable quantity of useful metals remain in slag, which is generated from the steel-making process, a method for recovering the useful metal from the slag is required. Conventionally, for the sake of recovering the useful metals included in the slag, the slag is pulverized in large-sized pulverizers to obtain powder which is subsequently conveyed to a furnace on a conveyer mounted with a magnet.

However, the conventional method costs a great deal since a plurality of large-sized pulverizers and magnetic conveyers which are expensive must be installed to recover the useful metal included in slag. Especially, polluting factor such as dust and noise occurs during the pulverization of slag, so that the working conditions for workers become deteriorated.

In the meanwhile, the slag generated in a convertor during making steel is comprised of various constituents, mainly $Fe_2O_3$ and $CaO$. Of the constituents, materials including Fe, such as FeO and $Fe_2O_3$ are extracted from the slag. The slag from which the useful metal is recovered (hereinafter "recovered slag") is then discarded as it is or is used as landfill. However, there occur many problems in the recovered slag since the main constituent, calcium oxide (CaO), is vulnerable to weathering. For example, in case of discarding the recovered slag in the sea, calcium oxide is likely to be changed by seawater and salts into an alkaline compound such as calcium hydroxide (Ca $(OH)_2$) compound, which pollutes the seawater and arrests the growth of fishes and marine plants. In addition, the use of recovered slag as landfill may causes the subsidence of ground. On the other hand, in the case the recovered slag is left as it is on land, the recovered slag is weathered to become powdery, so that alkaline fine powder such as calcium oxide may blow to injure nearby residential streets and forests.

By definition, weathering is the action in that a rock or an ore is broken down and decomposes into earth and sand on the surface on or in the earth. Weathering is largely classified into mechanical weathering (physical weathering) and chemical weathering. Mechanical weathering means that a rock is weathered by mechanical force. For example, as the air is heated and cooled, a rock or the like undergoes repeated expansion and contraction resulting in very small crevices in which freezing, hydrating and salt crystal extracting occurs. The rock ultimately splits due to inner expansion into pieces, loses its crystal lime water finally becomes powder. In addition, a rock is broken down by the mechanical destruction of living things such as microorganisms and plants. On the other hand, chemical weathering, by definition, means that the constituent of a rock, an ore or the like is chemically changed and is discomposed by chemical action of chemical agents or living things, such as hydration, hydrolysis, oxidation, reduction, carbonation, ion exchange and dissolution. Chemical weathering process is generally dependent on the properties of the rock or the ore, pH of solvent such as rainwater, the amount of compound dissolved in the solvent, such as oxygen, carbonic acid gas, ammonia, inorganic acid and organic acid, temperature and the like. By way of example, on the surface of an ore or slag exist unsaturated radicals, which are generally reactive points with water, hydrolysis and hydration occurring thereat. Accordingly, metal ion, $M^+$ in the ore or the slag becomes MOH, while $H^+$ if it exists in the slag, permits the ion of crystal to be changed into hydroxide ion ($OH-$) which combines with CaO, MgO and the like to demolish the existing structure thereof. As a result, the slag is broken down into particles such as clay which is then dehydrated into dry, fine powder. In most cases, the two classes of weathering have influence on an object, simultaneously and synergistically. Consequently, the slag is decomposed by these weathering into a powder of $CaCo_3$, CaO, $Ca(OH)_2$, MgO, $Fe_2O_3$, $Fe(OH)_3$ or the mixture thereof, which then blows into the air and causes serious pollution.

SUMMARY OF THE INVENTION

For solving the problems stated above, the present inventor has recognized that there exists a need for a method effective to recover useful metals from slag and capable of utilizing substantial amounts of the slag, whereby the slag not only becomes weathering-resistant but also would be turned into useful materials, for example, landfill, aggregates for concrete, and the like.

Accordingly, an object of the present invention is to provide a method for recovering useful metals from slag economically, improving the working conditions.

Another object of the present invention is to provide a method for recovering useful metals from slag, capable of making the slag weathering-resistant and thus facilitating the disposal thereof.

A further object of the present invention is to provide a method for recovering useful metal from slag, capable of turning the slag into useful materials.

The above objects can be accomplished by providing a method for recovering useful metals from and the slag generated from steel-making process, which comprises the steps of atomizing the slag in water, to give slag having various sizes screening the atomized slag so as to classify it by sizes, dropping the classified slag into a flow of blowing air to sort it into two groups, a high weight group short flight group having a first specific gravity and to low weight group long tight group having a second and different specific gravity from the first, the first specific gravity being higher than the second group having and transferring the high-weight group into a furnace to recovering useful metal therefrom.

In accordance with the present invention, when the slag which is under a temperature causing a massive structure or more to be formed is subjected to the treatment of atomization, the slag is cooled rapidly to form spheroid structures therein, so that it is transformed into hard, weathering-resistant substance, which is subsequently classified into a high useful metal content and a low useful metal content of slag by a blowing flow with the high useful metal content of slag transferred into a furnace and the low content used as useful materials.

The above and other objects of the present invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

Hereinafter, a presently preferred method of the present invention is described in detail.

Generally, slag is said to be a non-metallic composition generated by the action of fluxes in making steel. The fluxes are added into a convertor in order to improve the smelting effect. As a flux, lime (mainly, of CaO), limestone (mainly, of $CaCO_3$), or fluorite is usually used. The composition of slag is as follows: $FeO \leqq 1$ wt %; $Fe_2O_3$ 22 to 35 wt %; $SiO_2$ 7 to 10 wt %; CaO 36 to 43 wt %; $Al_2O_3 \leqq 1$ wt %; MgO 6 to 9 wt %, $P_2O_5$ 1 to 2 wt %; and $S \leqq 0.06$ wt %. Since the fluxes the slag and the iron ultimately become the constituents of the slag and the iron included in an ore is not extracted therefrom completely, the slag comes to consist of mainly $Fe_2O_3$ and CaO. In a melted state, CaO of strong basicity and $Fe_2O_3$ of strong acidity along with $SiO^2$ and MgO allow the slag to have a proper silicate degree, so that the slag maintain a suitable viscosity.

The detailed description will be given next for the transformation of the slag generated in a convertor into spheroid structures having weathering-resistance. Before treating the slag, it is under melted state and the constituents thereof are dissociated into ions which are distributed uniformly in a liquid state. When the melted slag is cooling slowly, each of the ions is solidified into its own constituent molecule, for example, $Fe_2O_3$ and CaO. These molecules come, then, to aggregate and are linked, respectively, so that each crystal is distributed in the solid slag. Such deposited compounds as $Fe_2O_3$ and CaO do not combine together, so that they do not become a composite molecule. However, they are weathered and thus become powder, so as to blow in the air. Especially, CaO plays an important role during the weathering.

However, when the slag is subjected to the treatment of atomization in accordance with the present invention, the uniformly distributed ions such as $Ca^{2+}$, $O^{2-}$, $Fe^{2+}$ and the like exist under a solid solution state with the slag cooled rapidly. As a result, the ions combine with one another to construct a form having a general formula $X^{II}O$—$Y^{III}_2O_3$ or $(Me)_2O^{2-}{}_4$. In the slag treated in accordance with the present invention, there exist composite oxides such as $CaOFe_2O_3$, $SiO_2Fe_2O_3$, $MgFe_2O_3$, and the like, which are the spinel-type composite of bivalent oxide and trivalent oxide.

The structure of such new phase is a kind of structures of crystal represented in ABO compound wherein A and B are metal elements and has a figure of regular octahedron. Namely, the structure is a general spinel structure which is subjected to a cubic system and in which the oxygen atoms consist of a cubic close-packed structure. A and B are placed in the spaces among the oxygen atoms of the cubic close-packed structure, A atom being in a tetrahedral hole consisting of 4 oxygen atoms and B atom being in an octahedral hole consisting of 6 oxygen atoms.

Spinel is originally said to be $MgAl_2O_4$, since the spinel structure is found first in this compound. Such crystals having the spinel structure are both abundant in nature as well as being made artificially. The spinel-type crystal is relatively hard with the hardness of approximately 5.5 to 8, shows a luster like glass and has a high reflective index. Of the crystals, those that are transparent in appearance without color are so hard that they may be used as jewels. In addition, the transparent crystals are weather and corrosion resistant, and can become as weather and corrosion resistant, as ruby and crystallized quartz.

In other words, chemical reactions, all of which are carried out by the motion of ions or electrons, do not proceed in the slag as the spinel-type composite oxides constitute the surface of the slag. Accordingly, the slag treated with the inventive method exhibits improve resistance to chemical and physical deterioration such as weathering and hence can maintain its the original state.

Each of the spheroids obtained by atomizing the slag in water is different in diameter and includes the useful metals to some degree therein. However, the weight of the spheroid is most dependent on not the size but the useful metal content. For example, if the useful metal content of the slag is high, the slag is heavy even though the size is small. On the other hand, if the useful metal content is low, the slag is light, regardless of the size.

However, in an effort of ensures uniformity, the spheroidal slags treated to atomization are classified by sizes. In accordance with the present invention, the spheroidal slags are screened with a plurality of screens having various meshes, for example, 0.5, 2, 5 and 8 mm, and the spheroidal slags of similar diameters then are grouped together. Aside from this, the spheroidal slags may be classified by sizes through the adjustment of a blowing pressure.

Next, according to the present invention, the spheroidal slags of similar diameters are dropped into a blowing flow of constant blowing pressure. This separates the slag into two weight groups, referred to herein as the first and second group. The first group has a higher weight than the second group and falls a shorter distance from the dropping point than the second group, the slag of which, having a lower weight than the first group, falls a longer distance from the dropping point. That is, if the slag group having similar diameters is projected into a blowing flow generated from a blower with a constant pressure, the high useful metal content and the low useful metal content of slag are sorted easily since the former has a shorter flight while the latter a longer flight. Generally, the slag of the first group has specific gravity of more than 6.4 and the slag of the second group has a specific gravity of less than 3.4.

In accordance with the present invention, the slag including a quantity of the useful metal is transferred into a furnace to extract the useful metal therefrom.

In the meanwhile, the low-weight spheroids including little useful metal consist of mainly CaO. This is true of the waste slag pulverized according to the conventional method. However, the conventional waste slag reacts easily with moisture or water of the air, for example, as follows: $CaO + H_2 \rightarrow Ca(OH)_2$, so that it can not endure for a long time. On the contrary, the low-weight slag according to the present invention is not powdery, but in the form of an aggregate, and owing to the treatment of atomization, it has sufficient weather resistance to endure destructive factors for a long time.

In an aspect of the present invention, the low-weight slag is utilized as useful materials. The low-weight slag was classified by sizes since the atomized slag was screened with a plurality of screens having various meshes as mentioned above. The slag with a diameter of 0.5 to 5 mm is used as a short ball for short blast or a grit for grit blast, the slag of 2 to 8 mm as a flux and the slag of 8 mm or more as aggregates for concrete.

As explained hereinbefore, the method for recovering useful metal from the slag generated from steel-making process in accordance with the present invention does not require high-priced facilities, so that the useful metal can be recovered at a low cost. In addition, since the inventive method does not accompany with the pulverization, polluting factor such as noise and dust is eliminated and thus, the working conditions become more comfortable. Moreover, the inventive method is advantageous in a view of reuse because the low-weight slag is used as useful materials such as short balls, grits, fluxes and aggregates.

Whilst the present invention has been described with reference to certain preferred embodiment and examples, it will be appreciated by those skilled in the art that numerous variations and modifications are possible without departing from the spirit or scope of the invention as broadly described.

What is claimed is:

1. A method for recovering useful metal contained in slag generated in making steel, which comprises the steps of:
    atomizing the slag in water to produce atomized slag;
    screening the atomized slag so as to produce classified slag by sizes;
    dropping the classified slag of similar sizes into a flow of blowing air to sort the classified slag into a first group and a second group, the slag of the first group having a higher specific gravity than the slag of the second group; and
    transferring the slag of the first group into a furnace to recover the useful metal therefrom.

2. A method according to claim 1, wherein said second group comprises slag having a diameter of 0.5 to 5 mm that is useful for a shortball or a grit.

3. A method according to claim 1, wherein said second group comprises slag having a diameter of 2 to 8 mm that is useful as a flux.

4. A method according to claim 1, wherein said second group comprises slag having a diameter of 8 mm or more that is useful as an aggregate for concrete.

* * * * *